Figure 5:
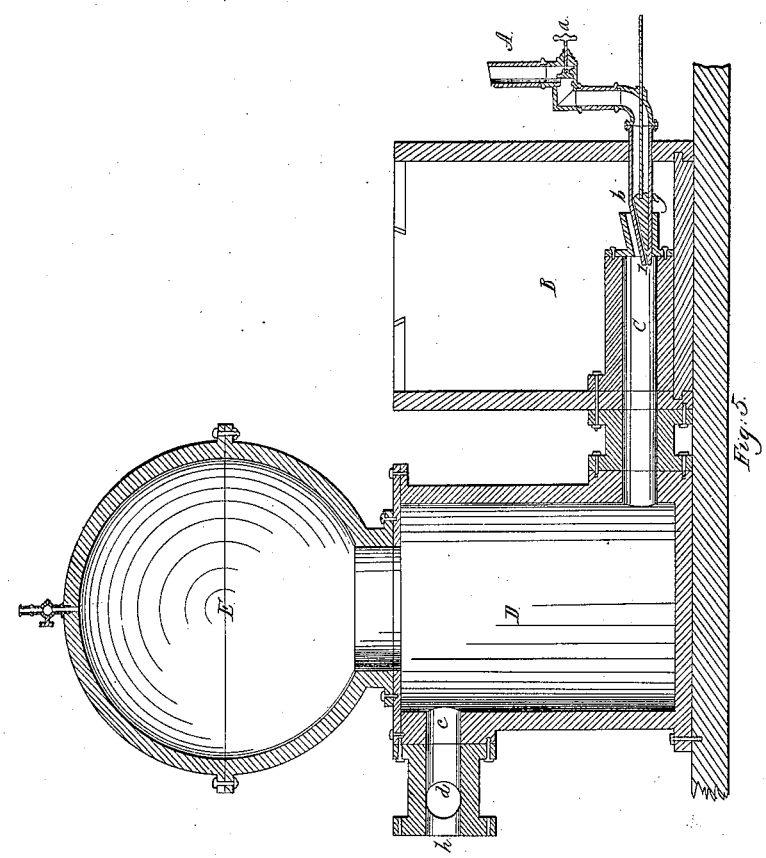

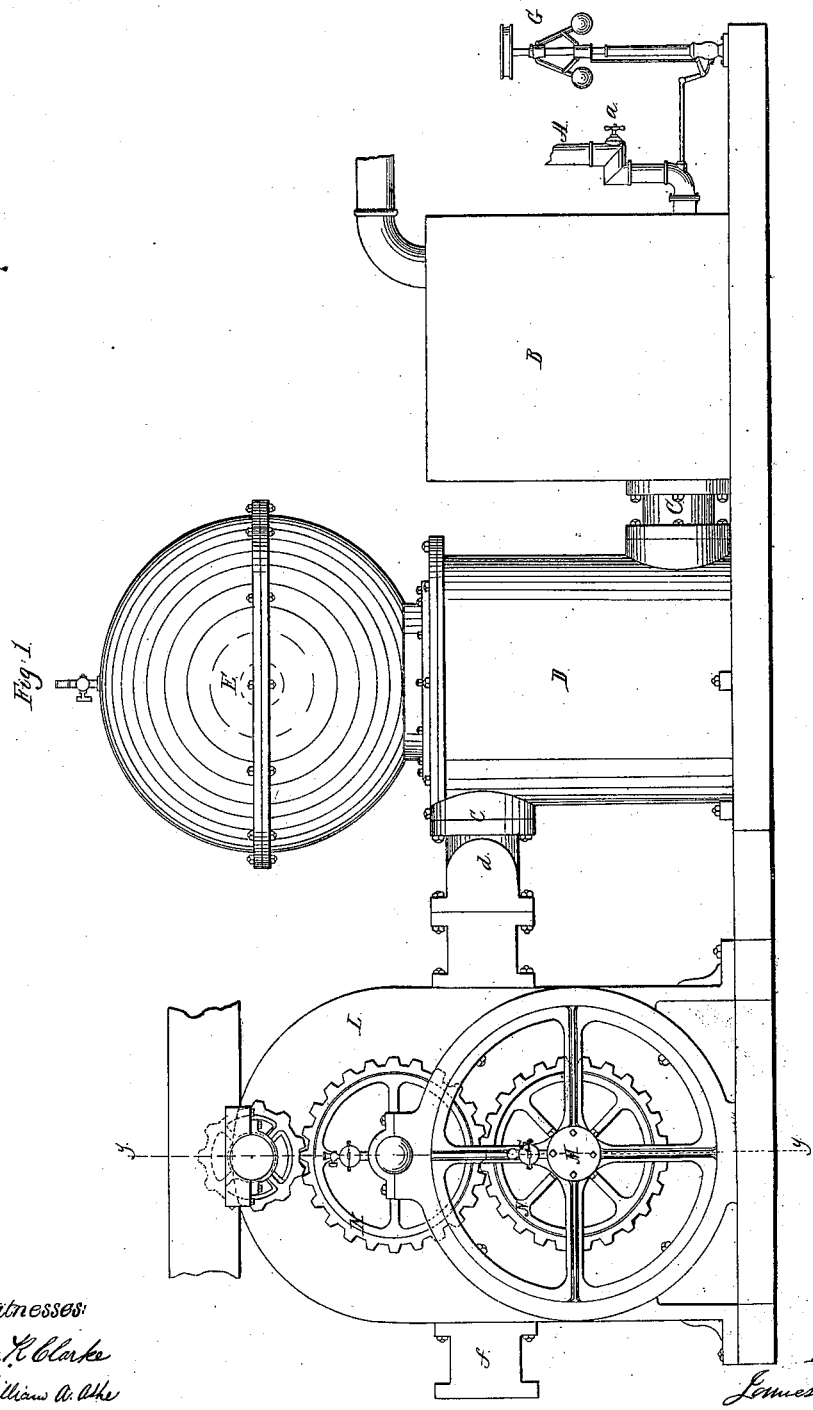

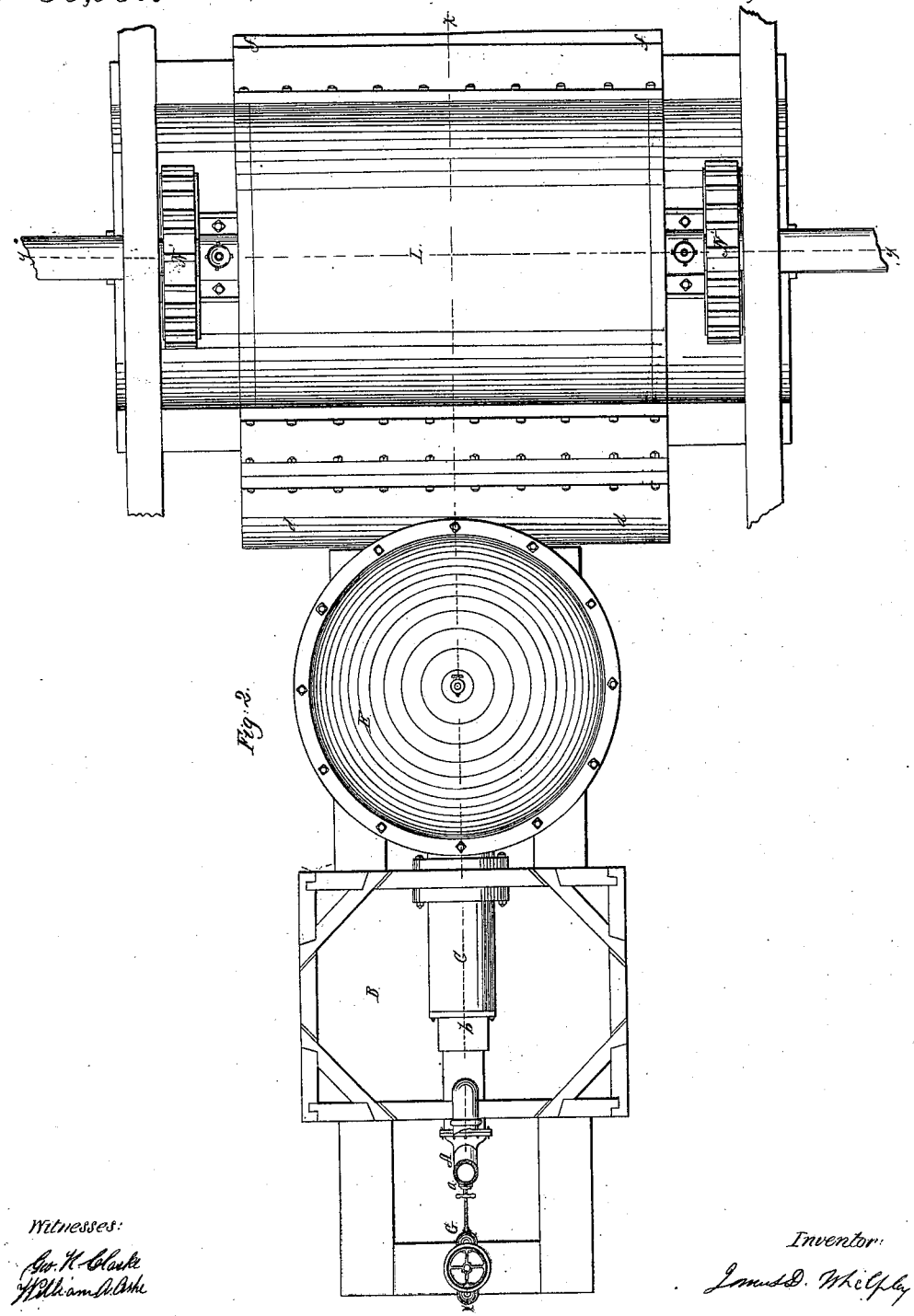

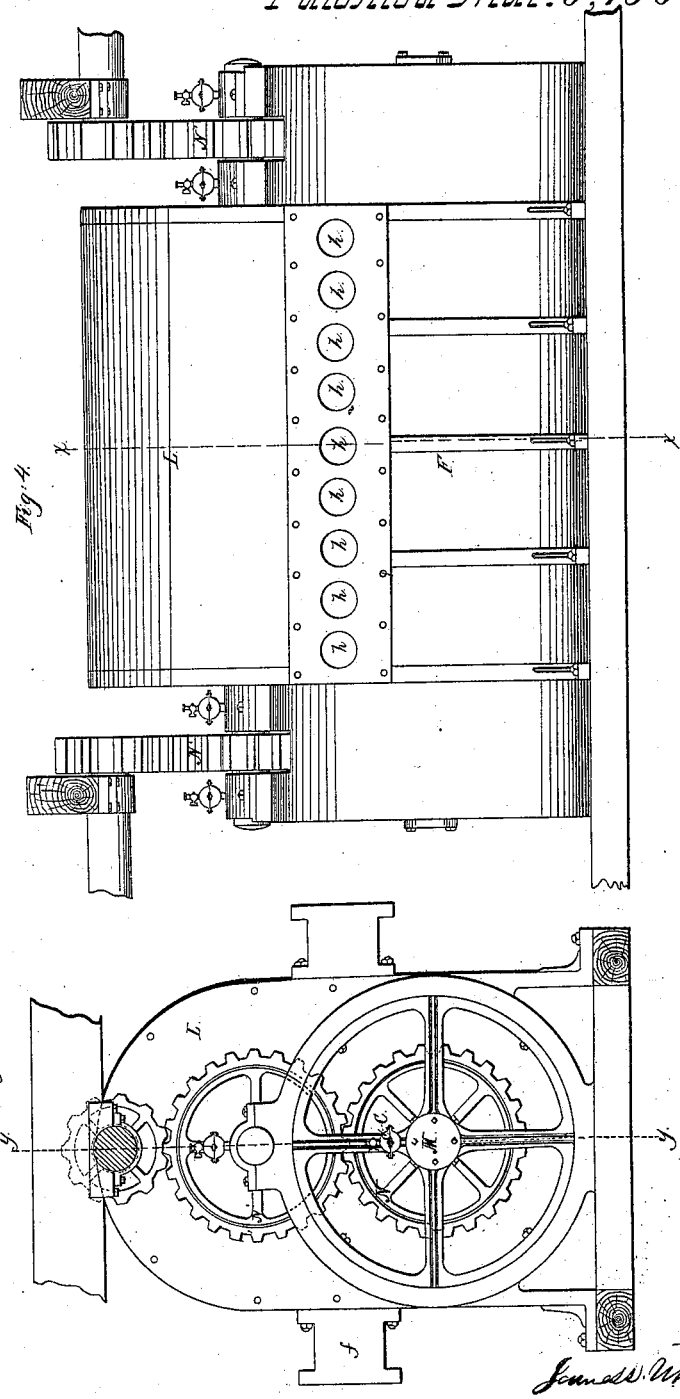

J. D. Whelpley
Rotary Steam Engine.

Nº 53,067. Patented Mar. 6, 1866.

Witnesses:
Geo. K. Clarke.
William A. Ashe.

Inventor:
James D. Whelpley

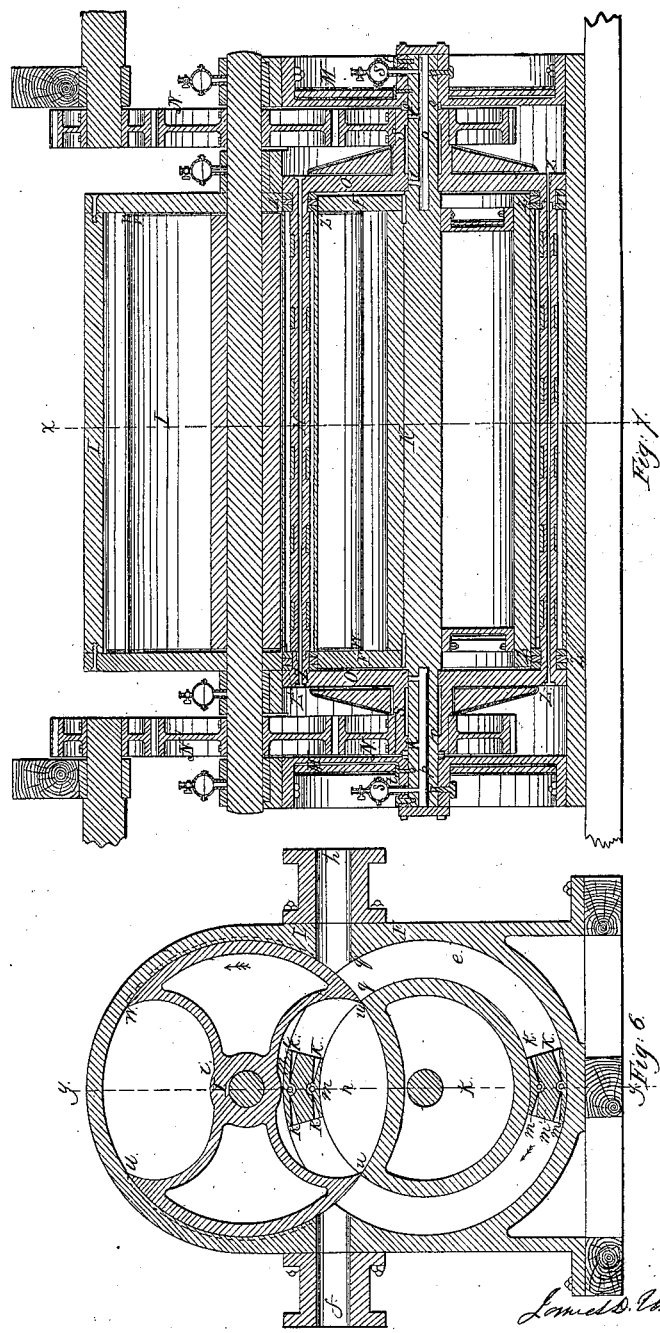

UNITED STATES PATENT OFFICE.

JAMES D. WHELPLEY, OF BOSTON, MASSACHUSETTS.

IMPROVED STEAM-INJECTED WATER-MOTOR.

Specification forming part of Letters Patent No. 53,067, dated March 6, 1866.

*To all whom it may concern:*

Be it known that I, JAMES D. WHELPLEY, of Boston, in the county of Suffolk and State of Massachusetts, have invented a new and useful Rotary Water-Motor; and I do hereby declare that the following is a full, clear, and exact description of the construction and operation of the same, reference being had to the accompanying drawings, forming a part of this specification, in which—

Figure 1 is a side elevation. Fig. 2 is a plan. Fig. 3 is a side elevation of the cylinder and attachments. Fig. 4 is an end elevation of the cylinder and attachments. Fig. 5 is a sectional view of the injecting apparatus in the line $xx'$, Fig. 2. Fig. 6 is a sectional view of the cylinder and its attachments, revolving piston, core, and abutment in the line $yy'$, Figs. 2 and 3. Fig. 7 is a sectional view of the cylinder-core, revolving piston, abutment, and attachments in the line $yy'$, Figs. 2 and 3.

Similar letters indicate similar parts in all the figures.

The design of this invention is to obtain a direct rotary motion, available as a power, by the action of a jet of steam upon a column of water, which fills the machine and carries it, thus furnishing with a moderate amount of coal a large amount of power, as by this method I think a complete utilization of the steam is obtained.

To enable others skilled in the art to make and use my invention, I will now proceed to describe the nature and operation of the same.

A is the steam-pipe, with its regulating-valve $a$, passing through the water-chest B and admitting steam into the injecting-tube C through the narrow opening in its beveled end, into which fits the wedge-shaped governing-valve $g$, connected in the usual way with the governor G, which regulates or controls the supply of steam with flat jet $l$, and therefore the supply and velocity of the water.

B is the water-chest, constantly supplied with water, and delivering it into the injecting-tube C through the vacuum-opening $b$.

D is the reservoir, receiving water under pressure through the injecting-tube C, and connected with the air-spring E, for the purpose hereinafter stated.

The stream of water forced forward by the impact of the steam admitted at $l$ passes the reservoir D, and is delivered by a discharge-pipe, $c$, into a horizontal tube, $d$, perforated with holes $h\ h$, which distribute the pressure and which open into the cylinder F, with its continuation L, for the rotary abutment, in which revolve the piston H and its rotary circular abutment I, with concave interior recesses, as drawn, which are so joined together on the outside of the cylinders F and L as to revolve in opposite directions in equal times, or, if made so that their radii are multiples of each other, in correlative times.

To utilize the whole power of the steam the interior of the cylinder F is filled with the core K, concaved on top to allow of the revolution of the abutment I, and around this core, in the cavity $e$, revolves the piston H, said piston being constructed as follows: $m\ m'\ m''$ are metallic pieces, beveled and hinged together in the center, as in Fig. 6, the outer surface of $m$ being concave to fit the circumference of the core K, and that of $m''$ being convex to fit the interior circumference of cylinder F. Between the interior surfaces of $m$ and $m''$ and the surfaces of $m'$ is an elastic packing, $k$, which, when pressed on by the water in $e$, expands the piston H and causes it to fit the space between the cylinder and its core, allowing the piston when not pressed by the water to move more freely during half its revolution, and, on passing the points $q\ q'$, Fig. 6, to enter the cavity $e$ without shock.

The purpose of the hinges in the piston H, connecting the fixed bar $m'$ with the movable pieces $m\ m''$, is to balance the faces of the metallic pieces $m\ m''$ on their centers, obviating the effects of centrifugal force in the rapid motion of the engine, and to allow of reversing the engine, as hereinafter described. The extremities of this piston H are attached to the revolving disk O by means of a ring, $z$, running in the ends of the cavity $e$ and carrying on its edges spring packing-rings of steel, $z'$, thereby preventing completely the escape of water. The disk O is perforated in the center to receive the fixed spindle $r$ of the core K, which spindle is enveloped by the pipe-box S, having a firm connection with the revolving disk O and carrying the cog-wheel N, geared with the cog-wheel N' of the abutment I, as and for the purpose before set forth.

At the end of the pipe-box S are friction-rings $o$, which support the lateral pressure of the water during the operation of the machine and transmit it to the frame M.

The core K, thus enveloped by the piston, its rings and disk, has a fixed spindle, r, passing through the revolving disk O and pipe-box S, and securely fastened to the frame of the machine M and to the core K, so as to render the latter immovable. This spindle r is pierced by the oil-chamber p, with its perpendicular pipes t t, as represented, Fig. 7, which is supplied from the oil-cup s hydrostatically, lubricating the bearings of the pipe-box S, as represented, Fig. 7.

The abutment I is constructed with the edges of the concaved interior recesses, i i, Fig. 6, somewhat nearer together than the edges of the concave superior recess of the core K, to avoid the dead-point and prevent backwater from the cavity n, which would be the case if this arrangement were not adopted. On the ends of the revolving abutment I is a spring-packing, consisting of a plate of rubber, w, Fig. 7, covered by a movable plate of steel, y, which compensates for wear and furnishes an equable grinding-surface.

The operation of this machine is as follows: The parts being in the position shown by Fig. 6, and steam being admitted at a, Fig. 1, a stream of water will be drawn through pipe b into injecting-tube C, filling the reservoir D, and will be forced through pipes c and d, with its holes h h, into the cylinder F, down through cavity e, till it strikes piston H, compressing the packing k, and expanding against the cylinder and core the edges of the metallic pieces m m', which otherwise move freely between the core and cylinder without the necessity of contact, making for the piston H a water-tight packing, while at the same time it contracts the piston on the opposite side, making it work wedging, and revolving piston H in the direction of the arrows, and the revolving abutment I in a reverse direction, by means of the cog-wheels N N', either in equal or multiple times, as explained, until the current enters the interior recess, i, of the revolving abutment I, when it is obvious that the current will act upward and downward during a portion of the revolution and continue to act alike on piston H and abutment I, transferring a portion of its power to each, and will so continue to act on one piston-head or the other, or on one and the abutment, during the revolution, and with equable force, the water expended in each revolution being discharged by pipes f beyond the cylinder.

It is obvious from an inspection of the machine that the motion of the piston and abutment can be reversed by introducing the stream on the other side at f, disconnecting pipe c, so as to furnish a discharge-orifice, and that this may readily be arranged with a Y-pipe, so as to be done by simply turning a valve, or by having double parts, except the cylinders, piston, and abutment. It will also be seen that the cylinder, piston, and abutment are similar on either side of a median line, x x', or a dividing-line, y y'.

The action of the air-spring, which in this engine is a body of air inclosed in an unyielding vessel, except when it presses on the column of water driven by the steam-jet, is to render the motion of the engine equable—an office it performs in conjunction with the governor; and by preventing a sudden decrease of the supply of steam from too rapidly reducing the power, or a sudden increase from too rapidly accelerating it, I consider the use of both indispensable to insure the evenness of motion in the engine. They therefore seem to me to present a patentable feature as a combination with such column of water.

After numerous and costly experiments in the conversion of heat into power, I have concluded that the true method is to utilize its momentum through an incondensable fluid, and I have also concluded that the best available absorbent or reservoir of heat is steam; and my researches lead me to believe that by converting the steam into water I can retain the momentum of the steam and apply it through a smaller volume; and that if, in addition to this, I inject into the induction-pipe sufficient water to supplement the reduced volume after condensation to its volume before condensation, I do not diminish the momentum of the steam, though I do the velocity of the water drawn by it, as the pressure moves a greater weight. I consider, then, that I have discovered a new principle in the use of steam as a motive power—a principle which converts all its heat into power and which does not depend on the expansion or contraction of the steam; or if it does, I have at least discovered a new method of using steam so that a vacuum produced by condensation does not attract, but by my arrangement of devices repels, the piston.

What I claim as my invention, and desire to secure by Letters Patent, is—

1. The construction of the piston H and the abutment I with equal or multiple radii, and so recessing the abutment and gearing the piston and abutment together as to make them revolve with equal or multiple velocity.

2. The combination of the recessed abutment I with the recessed core K, substantially as described, for the purpose of avoiding the dead-point.

3. The arrangement of the double pistons H H as drawn, for the purpose of avoiding the dead-point.

4. The combination of the piston H with the disk O, carrying the ring z and ring-packing z', the pipe-box S, its cog-wheel N, and with the fixed spindle r, having its oil-chamber p, and perpendicular pipes t t, substantially as and for the purpose described.

5. The combination of the friction-rings o with the frame M and the pipe-box S and disk O, for the purpose of supporting the lateral pressure of the water during the movement of the engine.

6. The elastic automatically-reversible packing and packing-plates of the piston H, formed by the curved and beveled surfaces of the metallic pieces m m' m'', hinged together, with its rubber or other elastic support or packing, $k$, on either side compressible and expansible, substantially as described.

7. The arrangement of the ring $z$ on the disk O, carrying on its edges spring packing-rings $z'$, substantially as and for the purpose described.

8. The arrangement of the governor G and its valve, regulating the supply of steam which forces the water, in connection with the air-chamber containing the air-spring E, pressing upon said column of water, for the purpose of rendering equable the motion of the engine, substantially as described.

9. In an engine the power of which is derived from the heat of steam, the complete condensation of the steam between the boiler and piston, whether such condensation is effected by passing the steam through a chilled chamber, or, as I consider preferable, by introducing into the induction-pipe C a jet of steam and a stream of cold water at one and the same time, the volume of water introduced being the difference of volume lost by condensing the steam, the whole being accomplished by the arrangement of parts substantially as described.

JAMES D. WHELPLEY.

Witnesses:
   GEO. R. CLARKE,
   WILLIAM A. ASHE.